United States Patent

Jorgensen

[11] 3,897,649
[45] Aug. 5, 1975

[54] FISHING DEVICE
[76] Inventor: Aller J. Jorgensen, Highway 183, Alma, Nebr. 68920
[22] Filed: Jan. 31, 1974
[21] Appl. No.: 438,361

[52] U.S. Cl............................ 43/43.15; 43/44.92
[51] Int. Cl............................................. A01k 91/00
[58] Field of Search............. 43/43.15, 44.97, 44.9, 43/44.96, 44.91, 42.74

[56] References Cited
UNITED STATES PATENTS
| 2,494,620 | 1/1950 | Johnson | 43/44.9 |
| 2,572,790 | 10/1951 | West | 43/44.92 |
| 2,710,480 | 6/1955 | Gehrig | 43/43.15 |

Primary Examiner—Louis G. Mancene
Assistant Examiner—Peter K. Skiff
Attorney, Agent, or Firm—Zarley, McKee, Thomte & Voorhees

[57] ABSTRACT

A device for supporting a fishing hook above the bottom of a body of water comprising an elongated hollow tube having upper and lower ends with a weight secured to the lower end thereof. At least one hook support is secured to the hollow tube above the lower end thereof for supporting a hook and bait thereon above the bottom. A fishing line extends from the fishing rod upwardly through the weight and the tube for attachment to a bobber. The weight engages the bottom so that the bait is kept out of the mud.

4 Claims, 3 Drawing Figures

FISHING DEVICE

BACKGROUND OF THE INVENTION

Bobbers have long been used on fishing lines to maintain the hook and bait above the bottom. The bobbers work fine when the depth of the water is constant. However, when the depth of the water is shallower than anticipated, the bait will rest on the bottom. If the water is deeper than anticipated, the bait will be suspended an objectionable distance above the bottom which prevents the bottom from being fished.

Therefore, it is a principal object of the invention to provide a device which supports the bait above the bottom of a body of water regardless of the depth thereof.

A further object of the invention is to provide a device for supporting fishing hooks above the bottom of a body of water which may be cast.

A further object of the invention is to provide a device including means for adjustably supporting hooks and bait above the bottom of a body of water.

A further object of the invention is to provide a device for supporting fishing hooks and bait above the bottom of a body of water which is economical of manufacture, durable in use and refined in appearance.

These and other objects will be apparent to those skilled in the art.

DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

DESCRIPTION OF THE PREFERRED EMBODIMENT

Figure 1:
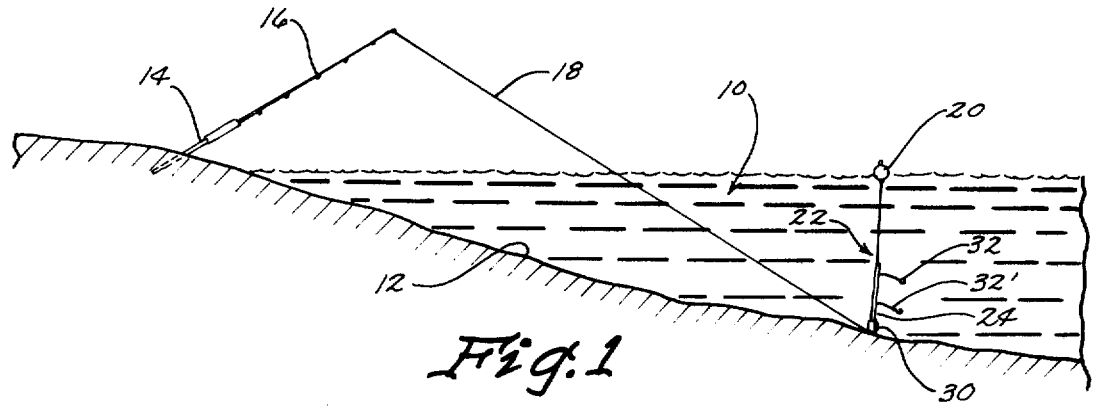
FIG. 1 is a side view illustrating the device being used.
Figure 2:
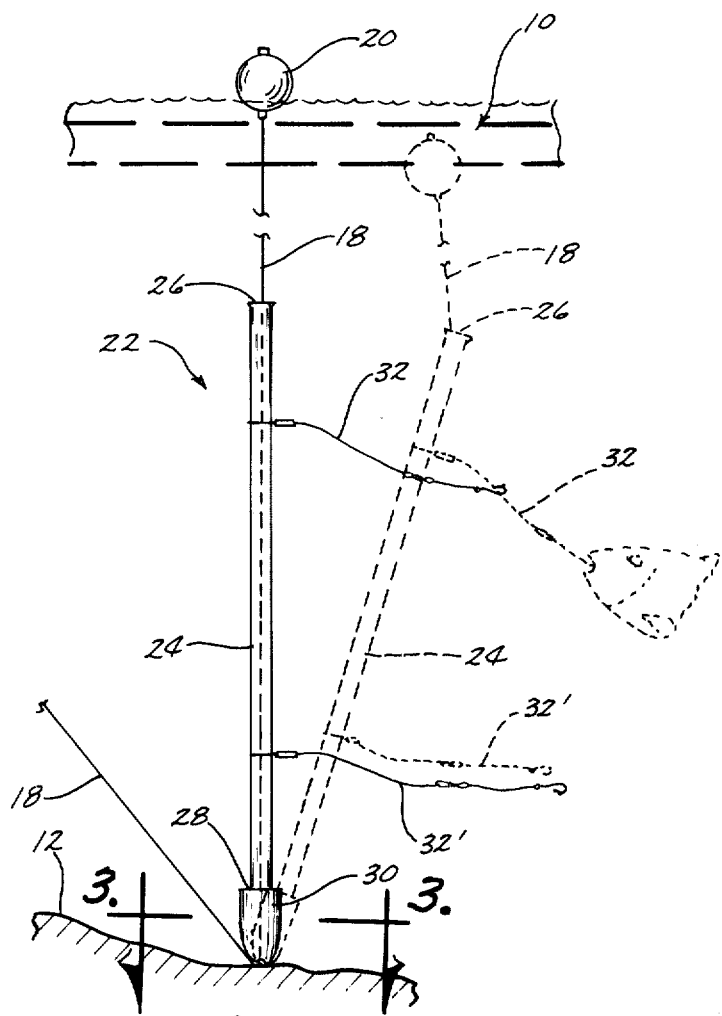
FIG. 2 is a side view of the device with the dotted lines illustrating the manner in which the device is tipped upon a fish striking the bait.
Figure 3:
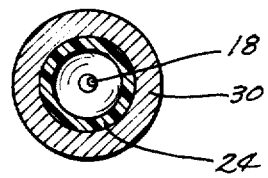
FIG. 3 is a sectional view seen on lines 3 — 3 of FIG. 2.

In FIG. 1, the numeral 10 refers to a body of water having a bottom 12. The numeral 14 refers to a conventional holder adapted to support a fishing rod 16 having a line 18 extending therefrom. The numeral 20 refers to a conventional bobber while the numeral 22 refers to the device of this invention.

Device 22 comprises an elongated hollow tube 24 having an upper end 26 and a lower end 28. A bullet-shaped lead weight 30 is secured to the lower end of tube 24 by glue or the like and has an opening formed therein which receives the line 18. A pair of leaders or fishing hook supports 32 and 32' are selectively adjustably mounted on the tube 24 and are adapted to support conventional hooks and bait thereon.

As seen in the drawings, the line 18 extends upwardly through the weight 30, through the tube 24 for attachment to the bobber 20 in conventional fashion.

In use, the bobber 20 and the device 22, with the hooks and baits attached thereto, are ordinarily cast outwardly into the body of water to the approximate desired position. The device 22 slides down the fishing line or string 18 after the cast until the weight 30 engages the bottom 12. After the bobber surfaces, the reel on the fishing rod is taken in slightly to insure that the device 22 will be maintained in substantially the upright position illustrated in FIG. 1. It can be seen that the device 22 maintains the bait out of the mud at the bottom of the water so that the fisherman is able to "fish" the bottom. The device automatically compensates for any depth of water since the line freely slides therethrough. If a fish strikes the bait, the device is laterally deflected which causes the bobber to move downwardly below the surface of the water to indicate to the fisherman that a fish has struck the bait. The dotted lines in FIG. 1 illustrate the manner in which the bobber is lowered to indicate a bite.

Thus it can be seen that a novel device has been disclosed which permits the bottom of the body of water to be fished without the bait dragging in the mud. It can also be seen that the device automatically compensates for any depth of water and therefore achieves all of its stated objectives.

I claim:

1. In combination with a fishing line having a bobber means secured thereto,
   a device for supporting a fishing hook above the bottom of a body of water comprising an elongated hollow tube having upper and lower ends, a weight secured to the lower end of said hollow tube and having an opening formed therein, at least one hook support secured to said tube above the lower end thereof, said tube and weight adapted to have the fishing line movably extending therethrough, said fishing line movably extending upwardly through said tube and weight, said bobber means being secured to said upwardly extending portion of said fishing line whereby said bobber means and said fishing line will maintain said tube in a substantially upright position so that said hook support is positioned above the bottom of the body of water regardless of the depth of the water.

2. The combination of claim 1 wherein at least a pair of hook supports are secured to said tube.

3. The combination of claim 1 wherein said hook support is vertically adjustably mounted on said tube.

4. The combination of claim 1 wherein the upper end of said tube is beveled outwardly and upwardly.

* * * * *